Figure 1:
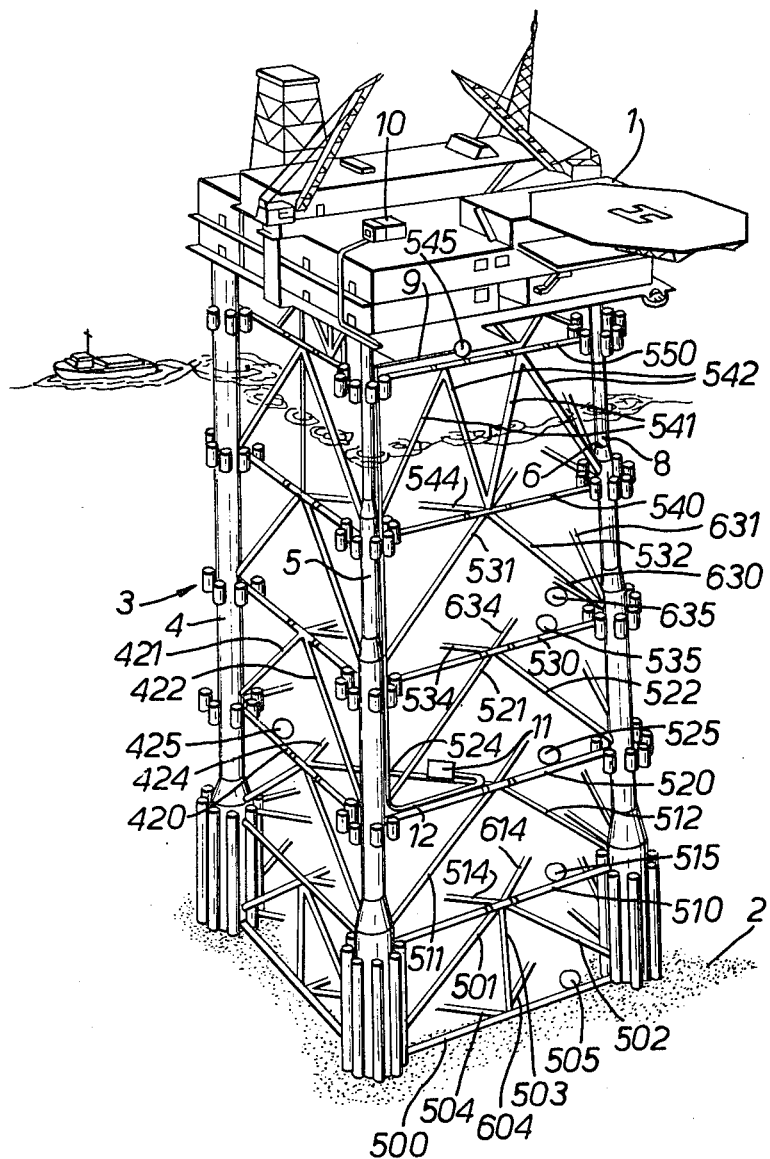

United States Patent [19]

Blondy et al.

[11] 4,425,054

[45] Jan. 10, 1984

[54] MARINE PLATFORM ADAPTED TO FACILITATE THE DETECTION OF POSSIBLE CRACKS

[75] Inventors: Rene Blondy, Ris Orangis; Henri Crohas, Meudon, both of France

[73] Assignee: Compagnie Francaise Des Petroles, Paris, France

[21] Appl. No.: 311,229

[22] Filed: Oct. 14, 1981

[30] Foreign Application Priority Data

Dec. 4, 1980 [FR] France ............................. 80 25736

[51] Int. Cl.³ .................. E02B 17/00; E02D 31/00; G01M 3/04
[52] U.S. Cl. ........................... 405/211; 405/195; 73/40
[58] Field of Search ............ 405/195, 204, 208, 211, 405/216; 73/40; 138/104

[56] References Cited

U.S. PATENT DOCUMENTS

| | | | |
|---|---|---|---|
| 3,093,972 | 6/1963 | Ward | 405/204 X |
| 4,143,540 | 3/1979 | Peterson et al. | 405/195 X |
| 4,285,615 | 8/1981 | Radd | 405/211 |

Primary Examiner—David H. Corbin
Assistant Examiner—Nancy J. Pistel
Attorney, Agent, or Firm—Sughrue, Mion, Zinn, Macpeak and Seas

[57] ABSTRACT

The present invention relates to a marine platform comprising a structure consisting of a lattice of tubular elements sealingly joined to one another. Pickups are provided on at least some of the tubular elements, to detect the passage of a fluid through the wall of an element. At a junction of one tubular element with another element whose interior space is monitored by a pickup, a backing plate is disposed in the one element facing the junction zone and sealed around the junction zone to define an intermediate space which is in communication with the interior space of the other element.

4 Claims, 3 Drawing Figures

MARINE PLATFORM ADAPTED TO FACILITATE THE DETECTION OF POSSIBLE CRACKS

The present invention relates to a fixed or floating marine platform whose structure consists of a lattice of tubular elements sealingly joined to one another, particularly by welding.

A very important problem for the security of installations at sea is that of detecting cracks which may form in these elements or in their connections.

One means of monitoring the condition of a marine platform comprises the installation, on the tubular elements constituting the platform structure, of pickups adapted to detect the passage of a fluid through a wall of a tubular element. These pickups may in particular be pressure gauges which monitor the maintenance of the pressure inside the tubular elements, which have previously been filled with a gas under pressure.

However, it is not always desirable or possible to subject all the internal spaces of the tubular elements to monitoring. This is, for example, the case with the spaces inside the legs of platforms internally filled with piers, the annular space between pier and leg being filled with water or cemented. Another such case comprises legs of large dimensions which are filled with water, or tubular elements stiffened by the injection of polymerisable resin.

One aim of the invention is to permit the monitoring of the junction zone of two tubular elements, known respectively as the receiving and the received elements, while the space inside one of them, the receiving element, is not monitored by a pickup.

Another aim of the invention is to permit the connection of the spaces inside at least two tubular elements, known as the received elements, connected in a so-called junction zone to one and the same tubular element, known as the receiving element.

According to the invention there is provided a marine platform comprising a structure consisting of a lattice of tubular elements sealingly joined to one another, pickups provided on at least some of said tubular elements and adapted to detect the passage of a fluid through a wall of a tubular element, wherein at least one said tubular element, known as a receiving element, to which in a junction zone there is connected at least one other of said tubular elements, known as a received element and whose interior space is monitored by a pickup, contains a back plate disposed facing said junction zone and sealingly fixed against the wall of said receiving tubular element so as to form around said junction zone, between said wall of said receiving tubular element and said back plate, an intermediate space in communication with the interior space of said received tubular element.

In one embodiment, the back plate is disposed facing the junction zone of at least two received tubular elements, and holes formed in the wall of the receiving tubular element establish communication between the intermediate space and the interior space of each of these two received tubular elements, in such a manner as to bring the interior spaces of the two received tubular elements into communication by way of the said intermediate space.

Figure 2:
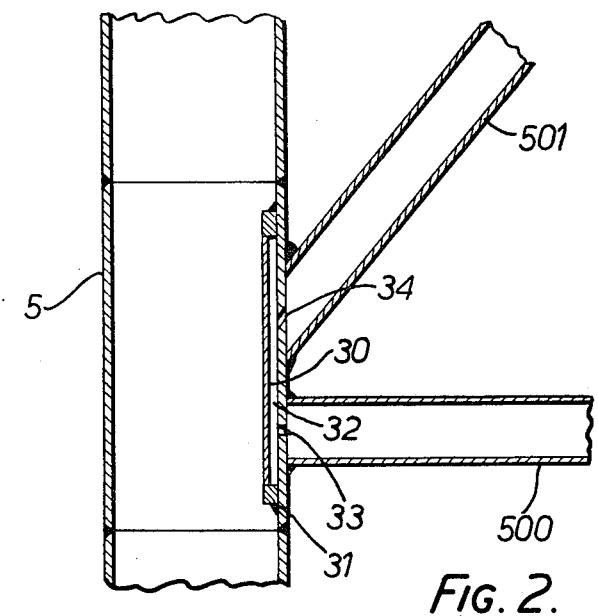
Figure 3:
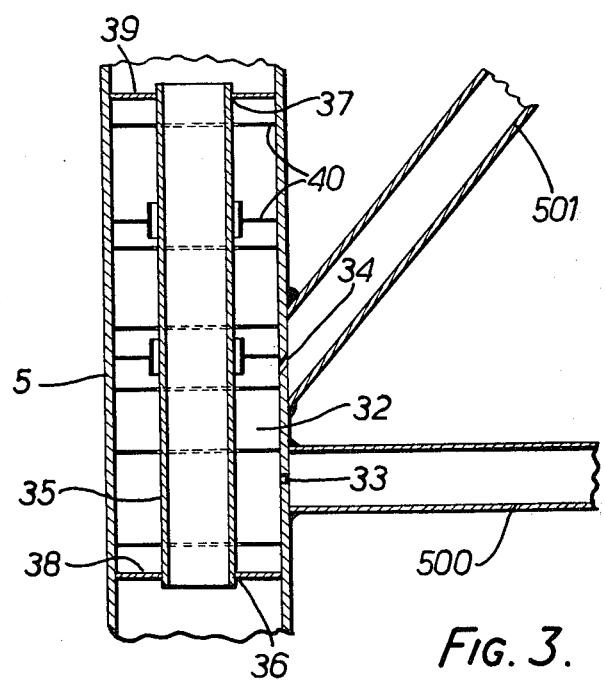

Other features of the invention will emerge from the following description of embodiments, given by way of example only, with reference to the accompanying drawings, in which:

FIG. 1 shows in perspective a complete platform provided with a crack detection system according to the invention, FIG. 2 is a view in section of a junction of tubular elements including a leg, and FIG. 3 is a view in section of a modification of the junction shown in FIG. 2.

FIG. 1 shows a marine platform 1 supported on a sea bed 2 by a structure 3 of tubular elements welded sealingly to one another. These tubular elements are composed of four upwardly directed legs, of which three 4, 5, 6 are visible in the figure, and of an assembly of connecting elements which extend on the one hand in the faces formed between the successive legs and on the other hand from one face to another in horizontal planes, where they form rectangles (they are then referred to as horizontal struts). The connecting members situated in a face comprise horizontal chord members and inclined struts. The connecting members will be given references comprising a three-digit number in which the first digit is the reference numeral 4, 5, 6 (the leg which should bear the reference 7 not being shown in the drawings) of the leg viewed by an observer standing inside the structure 3, facing the member in question when the latter is a horizontal strut or on the right of the face to which the member belongs if the member is an element of a face, the second digit corresponds to the level 0, 1, 2, 3, 4, 5 of the horizontal member—the horizontal chord member or horizontal strut in question—or of the chord member above which the inclined strut in question rises, while the third digit is 0 in the case of a chord member, 1 or 2 in the case of a strut inclined in one direction or the other, 3 in the case of a vertical strut, and 4 in the case of a horizontal strut.

One pickup could be disposed on each tubular element, but it appears preferable to group together a plurality of tubular elements to form a common interior space monitored by one and the same pickup.

On the face to which the reference of the leg 5 is given, provision has here been made to arrange the tubular elements in the following manner:

Group of elements 500-501-502-503-504 with a pickup 505;

Group of elements 510-511-512-514 with a pickup 515;

Group of elements 520-521-522-524 with a pickup 525;

Group of elements 530-531-532-534 with a pickup 535;

Group of elements 540-541-542-550 with a pickup 545.

The other faces may have similar groupings. For example, on the face to which the reference of the leg 4 is given there will be groups such as the group of elements 420-421-422-424 with a pickup 425, and on the face to which the reference of the leg 6 is given there will be groups such as the group of elements 630-631-632 (not visible)-634 with a pickup 635.

This grouping obviously only constitutes an example among may other possibilities.

The level of the sea has been shown at 8. The pickup 545 is generally out of the water and has been connected by a cable 9 to an acquisition unit 10 disposed on the platform. The pickups 505, 515, 525, and 535 are continuously submerged and they are adapted to transmit an acoustic signal which passes through the water to a submerged intermediate transmission means 11, which converts the acoustic signals received into electric signals and which is connected by a cable 12 to the acquisition unit 10.

These pickups are here manometric pickups monitoring the maintenance of the air pressure which was initially established inside the tubular elements.

FIG. 2 shows a communication which can be established between a connecting member and a leg if it is not desired or not possible to fill the leg with compressed air. This communication can also make it possible to establish a passage between at least two received tubular elements meeting on a receiving element, such as a leg. Use is made of a back plate which is placed facing the junction of these tubular elements to the leg, inside the leg, and which is applied around this zone in a fluid-tight manner against the wall of the leg. FIG. 2 illustrates an arrangement of this kind at the junction of the chord member 500 and the strut 501 with the leg 5. A back plate 30, formed by a hollowed-out plate extending over a portion of a cylinder, is welded on its periphery to the interior of the leg 5 in a fluid-tight manner along a line 31 surrounding the entire junction zone of the chord member 500 and the strut 501 with the leg 5.

The space 32 between the back plate 31 and the leg wall 5 serves the dual function of creating a communication passage between the interior of the chord member 500 and the interior of the element 501 by way of holes 33 and 34 formed in the portion of the leg wall 5 which is surrounded by the plate, and of extending the monitored zone to the wall of the leg near the connections of the latter to the connecting members. This arrangement can be applied to receiving tubular elements other than legs. The second function defined above may also be carried out alone, the space 32 being in communication only with the interior of one of the received tubular elements 500 or 501.

FIG. 3 shows another construction of a back plate. Here the back plate 35 is formed by a cylinder fixed in a fluid-tight manner at its longitudinal ends 36,37 by flanges 38,39. This cylinder 35 is coaxial to the leg 5 and it has an outside diameter slightly smaller than the inside diameter of circular stiffeners such as 40, which are disposed inside the leg.

It will be understood that the back plate composed of a cylinder and flanges is not necessarily in the form of a specially added part, but that it can be produced by the combination of two stiffeners provided and arranged for the purpose.

It will be realised that very many variations and modifications can be made to the embodiments described above, without departing from the scope of the invention.

What is claimed is:

1. In a marine platform comprising a structure including a lattice of hollow tubular leg elements and hollow tubular strut elements sealingly joined to one another, an arrangement for monitoring the fluid tight integrity of the space within at least two of said tubular elements sealingly joined together at a junction zone, characterized by:

(a) an open end of a first one of said tubular elements (500) abutting an exterior surface of a second one of said tubular elements (5) within said junction zone and being sealingly joined to said exterior surface, (b) a back plate (30; 35) disposed within said second tubular element spaced from an interior surface thereof, and being sealingly fixed to said interior surface surrounding said junction zone to define an intermediate interior space (32) isolated from the remaining interior space of said second tubular element, (c) open passage means (33) penetrating a wall of said second tubular element within said junction zone to establish fluid communication between the interior of said first tubular element and said intermediate space, and (d) sensor means for detecting a change in the fluid pressure within said communicated interior of said first tubular element and said intermediate space.

2. A marine platform arrangement according to claim 1, further comprising a third tubular element (501) having an open end abutting and sealingly joined to said exterior surface of said second tubular element within said junction zone, and further open passage means (34) penetrating the wall of said second tubular element within said junction zone to establish fluid communication between the interiors of said first and third tubular elements and said intermediate space.

3. A marine platform arrangement according to either claim 1 or claim 2, wherein said back plate is a cylindrical section (30) sealingly fixed around the periphery thereof to said interior wall of said second tubular element.

4. A marine platform arrangement according to either claim 1 or claim 2, wherein said back plate is a cylinder (35) sealingly fixed by end flanges (38, 39) to said interior wall of said second tubular element.

* * * * *